(12) United States Patent
Chaudhuri et al.

(10) Patent No.: US 12,299,863 B2
(45) Date of Patent: May 13, 2025

(54) COKE MORPHOLOGY BY IMAGE SEGMENTATION

(71) Applicant: CHEVRON U.S.A. INC., San Ramon, CA (US)

(72) Inventors: Kaustav Chaudhuri, Vacaville, CA (US); Thomas M. Rea, Vacaville, CA (US); Estrella Rogel, Orinda, CA (US); Cesar Ovalles, Walnut Creek, CA (US); Paul E. Hajdu, Benicia, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 544 days.

(21) Appl. No.: 17/384,883

(22) Filed: Jul. 26, 2021

(65) Prior Publication Data
US 2022/0051393 A1 Feb. 17, 2022

Related U.S. Application Data

(60) Provisional application No. 63/064,998, filed on Aug. 13, 2020.

(51) Int. Cl.
*G06K 9/00* (2022.01)
*G06T 7/00* (2017.01)
*G06T 7/11* (2017.01)

(52) U.S. Cl.
CPC .............. *G06T 7/0004* (2013.01); *G06T 7/11* (2017.01); *G06T 2207/10048* (2013.01);
(Continued)

(58) Field of Classification Search
CPC ........ C10B 55/00–10; C10B 41/00–08; C10B 57/00–18; C10G 9/00–15/12; C10G 9/005; G06T 7/0002; G06T 7/0004; G06T 7/0006; G06T 7/0008; G06T 7/001; G06T 2207/30108; G06T 7/10–194; G06T 2207/20021; G06T 2207/20112–20168; G06T 2207/20081; G06T 2207/20084; G06T 2207/10056; G06T 2207/10061; A61B 5/7485; G06V 10/25–273; G06V 20/49; G06V 40/162; G06V 10/774–7796; G06V 20/69–698; G06K 9/6224;
(Continued)

(56) References Cited

U.S. PATENT DOCUMENTS 7,803,627 B2  9/2010  Hodges
2005/0263440 A1* 12/2005 Varadaraj ............... C10G 55/04
                                                        208/131
2012/0298553 A1  11/2012 Fern

FOREIGN PATENT DOCUMENTS

CN  101097205 A  *  1/2008
CN  113177913 A  *  7/2021
(Continued)

OTHER PUBLICATIONS

ASTM D4530-07 Standard Test Method for Determination of Carbon Residue (Micro Method) Jul. 15, 2011 (Year: 2011).*
(Continued)

*Primary Examiner* — Atiba O Fitzpatrick (57) ABSTRACT

The present invention is directed to a method for the prediction of coke morphology from feed characteristics using cross-polarized light optical microscopy, image segmentation, and statistical analysis.

7 Claims, 12 Drawing Sheets

(52) U.S. Cl.
CPC ............... *G06T 2207/20021* (2013.01); *G06T 2207/20036* (2013.01); *G06T 2207/20081* (2013.01); *G06T 2207/30136* (2013.01)

(58) Field of Classification Search
CPC .. G06K 9/6256; G06K 9/6257; G06K 9/6259; G06N 3/02–126; G06N 20/00–20; G06F 18/214–2155; G06F 7/023; G06F 40/16
See application file for complete search history.

(56) References Cited

FOREIGN PATENT DOCUMENTS

| | | | | |
|---|---|---|---|---|
| EP | 2894505 A1 | * | 7/2015 | ........... G02B 1/0092 |
| JP | 6694161 B2 | * | 5/2020 | ............. C10B 57/04 |

OTHER PUBLICATIONS

Manser, et al, Machine Learning Approaches for Easy and Precise Image Segmentation, Zeiss Zen Intellesis, Jul. 1, 2018, 8 pgs, XP055847649, Jena, Germany.
Ovalles, Predicting coke morphology in Delayed Coking from feed characteristics, Fuel 263 (2020) 116739, Available online Dec. 5, 2019, © 2019 Elsevier Ltd., 8 pgs.
PCT International Search Report and Written Opinion, mailed on Oct. 14, 2021, issued in International Application No. PCT/IB2021/056728, filed on Jul. 26, 2021, 13 pages.
Oya et al, Fuel 62, 274-278 (1983).
Guo et al. Fuel Processing Technology 104, 332-342(2012).
Chen et al. Fuel 219, 159-165 (2018) Manser et al., 2018.

* cited by examiner

COKE MORPHOLOGY BY IMAGE SEGMENTATION

FIELD OF THE INVENTION

This invention relates to the prediction of coke morphology from feed characteristics using cross-polarized light optical microscopy, image segmentation, and statistical analysis.

BACKGROUND OF THE INVENTION

Currently, there is no standard methodology for successfully predicting coke morphology in Delayed Coking based on feedstock properties. If such analytical techniques would be available, planners and engineers could use it to purchase opportunity feeds, optimize the operation of Delayed Cokers, and blend feeds without affecting processing. Delayed coking is one of several types of process used in oil refineries to convert heavy oils to useful lighter products. In delayed cokers, the heavy oil feed is heated in a continuously operating process furnace to affect a limited extent of thermal cracking, after which it enters a large, vertically-oriented cylindrical vessel or coking drum, in which the coking reactions take place. The term "delayed" coker refers to the fact that the coking reactions do not take place in the furnace, but rather are delayed until the oil enters the coke drum. The feedstocks for delayed cokers are typically the heaviest (highest boiling) fractions of crude oil that are separated in the crude fractionation unit, normally comprising an atmospheric distillation tower and vacuum tower. The nature of the coke formed is highly dependent on the characteristics of the feedstock to the coker as well as upon the operating conditions used in the coker. The morphology of the petroleum coke is typically described in simplified terms such as sponge coke, shot coke, and transitional coke. While shot coke has the same economic value as sponge coke, it is the desired product because it is easier to remove from the coker drum and has higher density results in increasing the processing capacity (higher liquid production).

Marsh and coworkers examined a series of shot cokes and sponge cokes from industrial delayed cokers Marsh, H., Carlvert, C., Bacha, J., Structure and formation of shot coke—a microscopy study, J. Mat. Sci. 1985, 20, 289-302. They found that shot coke spheres have an inner structure of fine-grained mosaic whereas, sponge cokes generally have larger optical textures, including domains. Eser and Jenkins reported that the chemical nature of asphaltenes (and not the maltenes) dominated in determining the morphology of the cokes produced from the petroleum feedstocks (Eser, S., Jenkins, R. G., Carbonization of petroleum feedstocks I: Relationships between chemical constitution of the feedstocks and mesophase development, Carbon 1989, 27, 877-887).

According to the literature, the interactions leading to the formation of the shot coke structure are the following (Elliott, J. D., Shot Coke: Design & Operations, Chem. Eng. World, 1999, 6, 83-90, Rahmani, S., William C. McCaffrey, W. C., Heather D. Denman, H. D., Murray R. Gray, M. R., Coking Kinetics of Asphaltenes as a Function of Chemical Structure, Energy & Fuels 2003, 17, 1048-1056, Shenghua, L., Chenguang, L., Guohe, Q., Yajie, Z., Phase Separation Behaviors and their Relations with Coke Formation in Thermal Reaction Systems of Vacuum Residua, Pet. Sci. Tech., 1999, 17, 693-709, Sawarkar, A. N., Pandit, A. B., Samant, S., D., Joshi, J. B., Petroleum Residue Upgrading Via Delayed Coking: A Review, Can. J. Chem. Eng. 2007, 85, 1-24. As the feed is heated, vaporization occurs, and cracking reactions begin. These reactions are taking place in the liquid phase and may lead to the precipitation of the asphaltenes, which will continue to react to form "pre-coke" and eventually, coke. The "pre-coke" material or mesophase is a high viscosity material having high plasticity. The velocity of this two-phase flow in the furnace transfer line and the coke drum, combined with the surface tension of the pre-coke, act to shape this material into spheres of various sizes, typically found in shot coke.

It has been reported in the literature that the potential to form shot coke is higher when the feedstocks have a % C7-asphaltenes (or Hot Heptane Insolubles HHI) to % Microcarbon Residue Test ratio (HHI/MCRT) of 0.4-0.5 (Guo, A., Lin, X., Liu, D., Zhang, X., Wang, Z., Investigation on shot-coke-forming propensity and controlling of coke morphology during heavy oil coking, Fuel Proc. Tech. 2012, 104, 332-342). Siskin analyzed six vacuum residua (VR) feeds and found correlations between the HHI/MCRT ($R^2$=0.51) and aromatic carbon/NSO atomic ratios ($R^2$=0.88) and the % of shot coke (Siskin, M., Kelemen, S. R., Eppig, C. P., Brown, L. D., Afeworki, M., Asphaltene Molecular Structure and Chemical Influences on the Morphology of Coke Produced in Delayed Coking", Energy & Fuels 2006, 20, 1227-1234. Barrios analyzed 26 feeds and found that the ratio HHI/MCRT is related to coke morphology as follows (9. Barros-Barrios, D. A., Development of an Empirical Model to Predict Delayed Coke Morphology and Bed Properties, M. Sc. Thesis, The University of Tulsa, 2010, Chapter 5, p 97-98): A method of predicting the morphological type of coke produced in a delayed coking process by measuring S-values of an asphaltene containing feedstock with an S-value machine has also been set forth, US 20120298553A1. Due to unknown molecular interactions between petroleum derived molecules, the prediction of coke morphology for blends may not always be linearly related.

It has been reported in the literature that the potential to form shot coke is higher when the feedstocks have a % C7-asphaltenes (or Hot Heptane Insolubles HHI) to % Microcarbon Residue Test ratio (HHI/MCRT) of 0.4-0.5.[3,7] Siskin analyzed six vacuum residua (VR) feeds and found correlations between the HHI/MCRT ($R^2$=0.51) and aromatic carbon/NSO atomic ratios ($R^2$=0.88) and the % of shot coke. Barrios analyzed 26 feeds and found that the ratio HHI/MCRT is related to coke morphology as follows:

HHI/MCRT<0.4→Sponge Coke 0.45<HHI/MCRT<0.64→Transitional Coke 0.64<HHI/MCRT→Shot Coke However, this correlation does not cover the existence of agglomerated shot coke or "hard coke" which is suspected to be at very high HHI/MCR ratios (>0.9), nor works well for the transitional region.

Previously, Optical Texture Indexes (OTI) have been used to characterize coke morphology. Those conventional optical-microscopy techniques are slow, time-consuming, operator-dependent, and have low repeatability and reproducibility, Oya et al, Fuel 62, 274-278 (1983), Guo et al. Fuel Processing Technology 104, 332-342(2012), Chen et al. Fuel 219, 159-165(2018).

Figure 4:
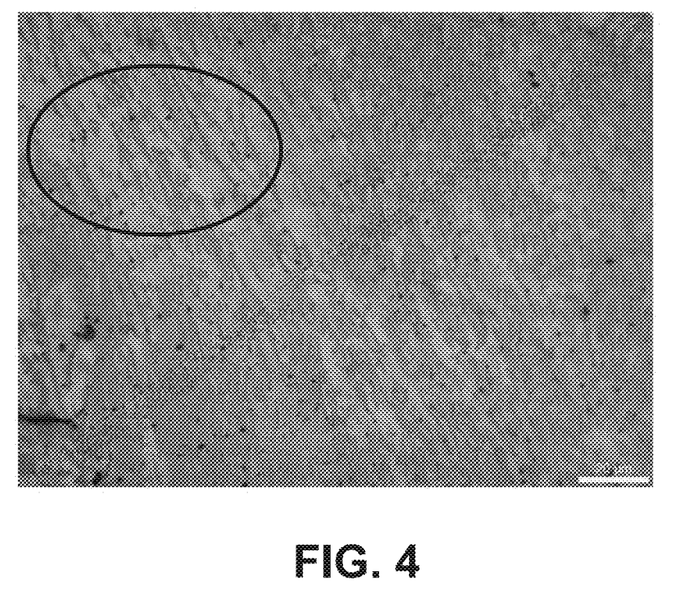
FIG. 4 is a micrograph of a known sponge coke sample using cross-polarized light optical microscopy.

Detailed analysis of the optical microscopy results showed that sponge-forming feeds have larger particles than shot-generating analogs, but the formers have particles of 10-20 µm that were not counted by the cross-polarized light optical microscopy (CPL-OM) method. Furthermore, the analysis of a known-sponge coke sample showed a mean particle size of 3.7 µm. As shown in FIG. 4, this sample has particles much larger 10 µm (e.g., black circle) that were not considered. Thus, it seems that the CPL-OM method not only has a large dispersion of the data and a weak correlation, but it is also favored toward small-size particles. Therefore, there is a need for new and improved analytical methods to determine the coke morphology of Delay Coking from feed characteristics.

SUMMARY OF THE INVENTION

Herein is disclosed a method for the prediction of coke morphology from feed characteristics using cross-polarized light optical microscopy, image segmentation, and statistical analysis.

An embodiment of the invention is the use of statistically derived Feret maximum values and other segmentation-derived parameters to predict coke morphology.

A further embodiment of the invention is predicting coke morphologies from blends of petroleum derived feedstocks, virgin and/or previously converted feeds, low percentage of distillable materials, high sulfur and nitrogen feeds, high metal containing feeds comprising of vanadium and nickel.

DETAILED DESCRIPTION OF THE INVENTION

Figure 1:
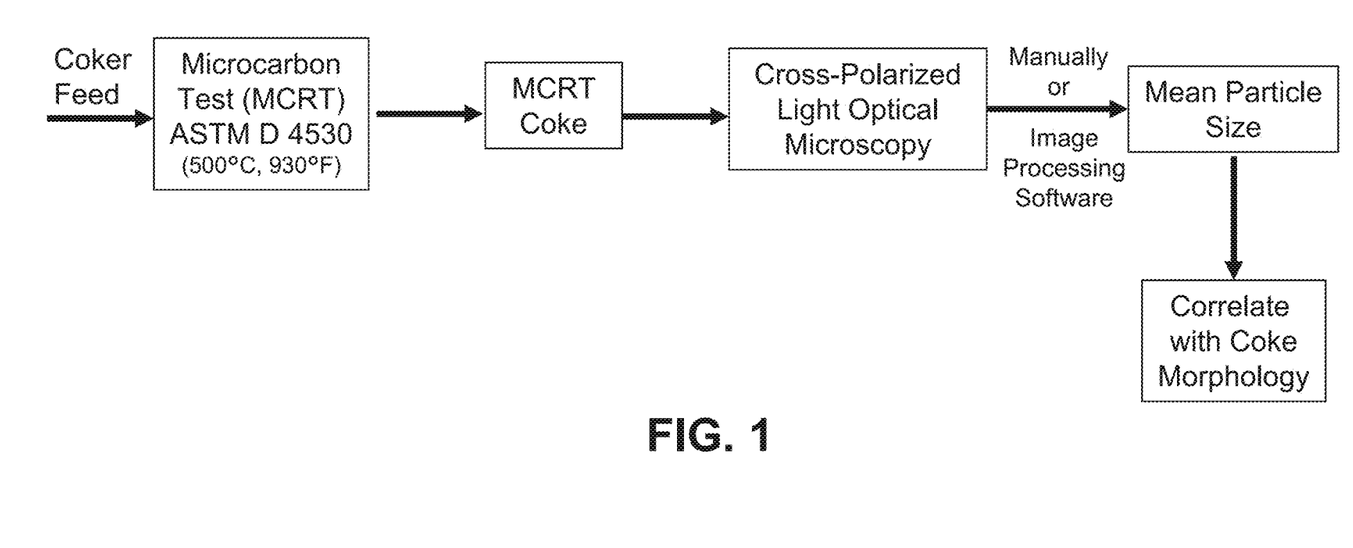
FIG. 1 is a diagram of the most common methodology to determine coke morphology based on the combination of Microcarbon Residue Test (MCRT) on a coker feed followed by cross-polarized light optical microscopy (CPL-OM) of the MCRT cokes.

The most common methodology (FIG. 1) to determine coke morphology is the combination of Microcarbon Residue Test (MCRT) on a coker feed followed by cross-polarized light optical microscopy (CPL-OM) of the MCRT cokes. CPL-OM uses a lambda plate and is recommended for specimens with very low reflectivity (such as coke and coal samples). Because polarized light converts contrast from gray to different colors, this technique exposes significant features of the coke that otherwise would not be captured. The methodology is shown in FIG. 1 involves taking several photographs of the MCRT cokes at 500× (see typical CPL-OM micrograph in FIG. 2), determining the mean-particle size manually or using an image processing software such as QImaging (http://www.ddisoftware.com/qimage-u/index.html) of ~300-400 particles and correlating with the coke morphology. By this way, shot-coke-forming feeds produce cokes with a less anisotropic mosaic structure of 1-10 µm whereas sponge coke-generating feeds lead to cokes with highly anisotropic (ordered) 10-60 µm flow domains. As described herein, image segmentation can effectively predict coke morphology in VR Blends.

Figure 5:
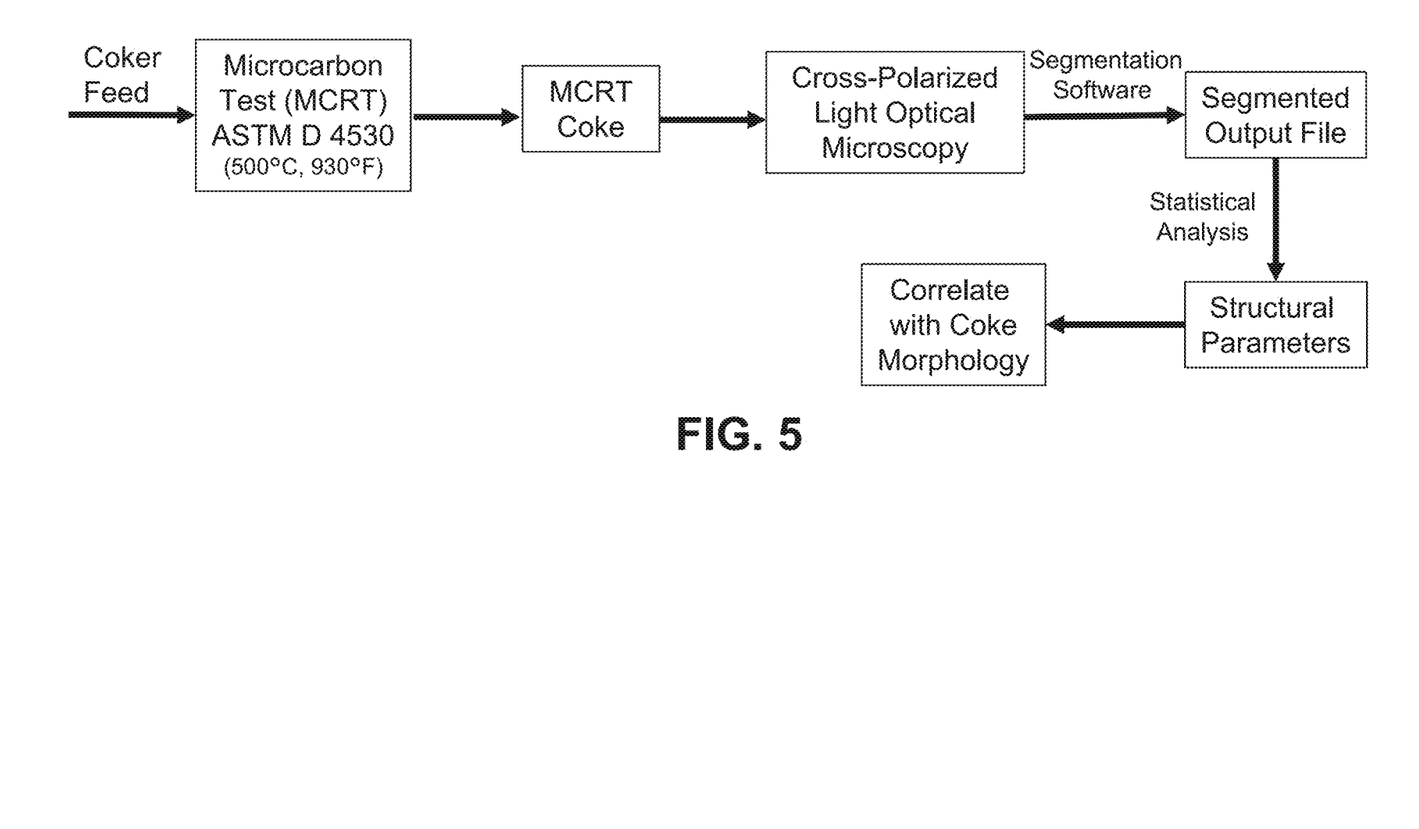
FIG. 5 is a diagram of the claimed method described herein to determine coke morphology based on the combination of Microcarbon Residue Test (MCRT) on a coker feed, cross-polarized light optical microscopy of the MCRT cokes, image segmentation, and statistical analysis.

Herein is described a methodology based on CPL-OM, image segmentation, and statistical analysis to predict coke morphology comprising shot, sponge, and transitional coke in Delayed Coking from feed characteristics. Image segmentation is the process of partitioning a digital image into multiple segments to simplify and/or change the representation into something easier to analyze statistically. As shown in FIG. 5., the new methodology involves taking several photographs of the MCRT cokes at 500× by CPL-OM, obtaining the segmented output file using a segmentation software such as Zeiss Zen™ Intellesis™ module, Manser, R., Elsässer, R., Doting, V., ZEISS ZEN Intellesis Machine Learning Approaches for Easy and Precise Image Segmentation, July 2018, Carl Zeiss *Microscopy GmbH*, Germany) determining several structural parameters by applying statistical analysis weighted by area using Microsoft Excel, and correlating those parameters with the coke morphology.

Thus, an embodiment of the invention as supported herein comprises:

1) Performing a microcarbon test (MCRT) on a coker feed, ASTM D 4530 to produce a MCRT coke sample,
2) Using cross-polarized light optical microscopy at 100×, 200× or 500×, preferably 500×, to produce a photo of the MCRT coke sample,
3) Using machine learning segmentation software to produce a segmented output file that comprises a partitioned image with multiple segments,
4) Determining structural parameters of output file by applying statistical analysis weighted by area,
5) Correlating the resulting statistical analysis to a coke morphology.

A further embodiment of the invention is the determination of critical structural parameters comprises the calculation of the weighted distributions of specific characteristics of the particles identified by image segmentation. The probability density function $f(x_i)$ of a weighted random variable or particle characteristic $x_i$ is given by:

$$f(x_i) = \frac{x_i \cdot A_i}{\mu}$$

Where $x_i$ is the i-particle characteristic such as maximum ferret, area, and elongation, $A_i$ represents the area of the i-particle, n is the number of particles and $\mu$ is given by:

$$\mu = \sum_{i=1}^{n} x_i A_i$$

The weighted average $\bar{x}$ is calculated as:

$$\bar{x} = \frac{\sum_{i=1}^{n} x_i A_i}{\sum_{i=1}^{n} A_i}$$

The cumulative distribution function is given by:

$$F(x_m) = \frac{\sum_{i=1}^{m} x_i A_i}{\mu}$$

Figure 2:
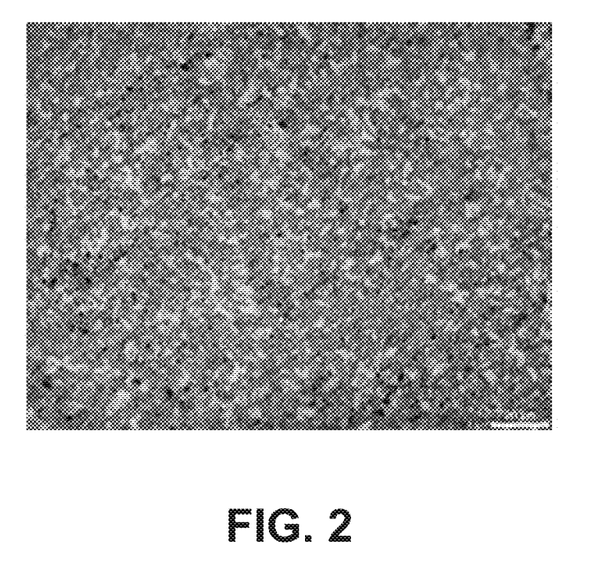
FIG. 2 is a micrograph of an MCRT coke sample using cross-polarized light optical microscopy.
Figure 3:
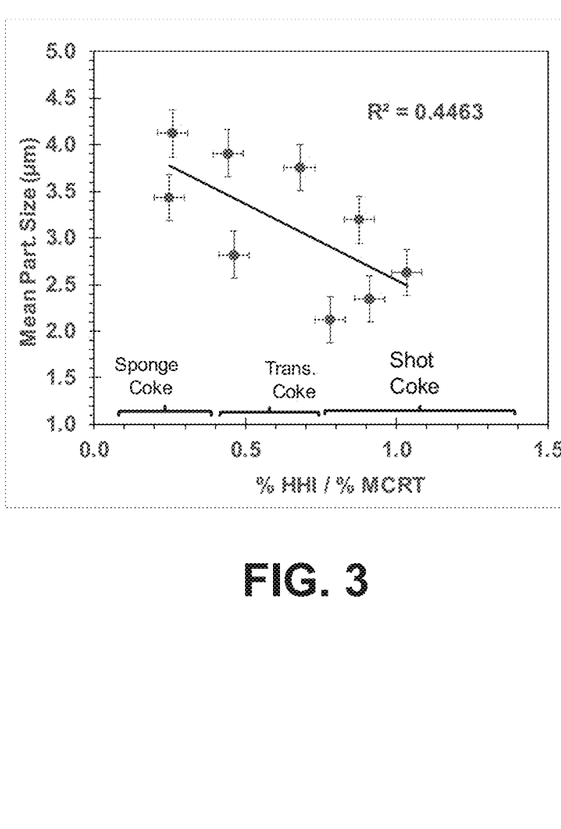
FIG. 3 is a plot of the mean-particle size determined using the method described in FIG. 1 vs. the percentage of hot heptane insolubles (% HHI)/% MCRT ratio for a series of nine Delayed Coking feeds.
Figure 6:
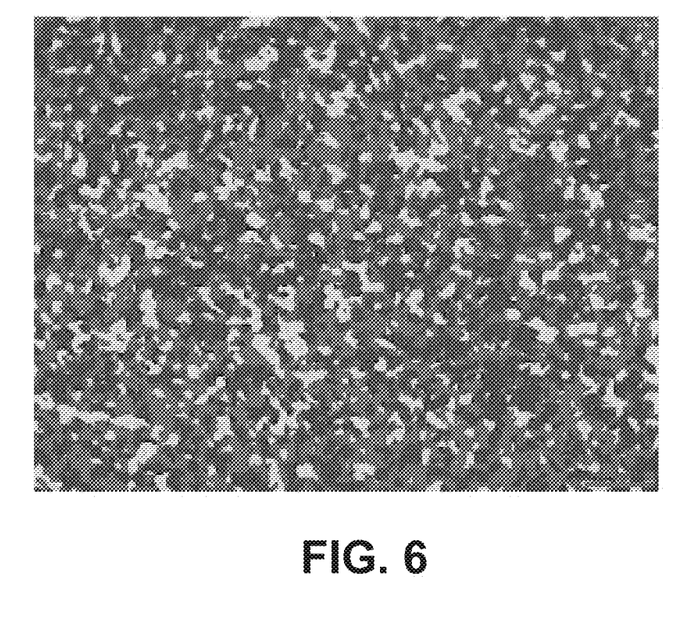
FIG. 6 is a photo of a typically segmented micrograph obtained from processing the one depicted in FIG. 2 using a segmentation software such as the Zeiss Zen™ Intellesis™ module.
Figure 7:
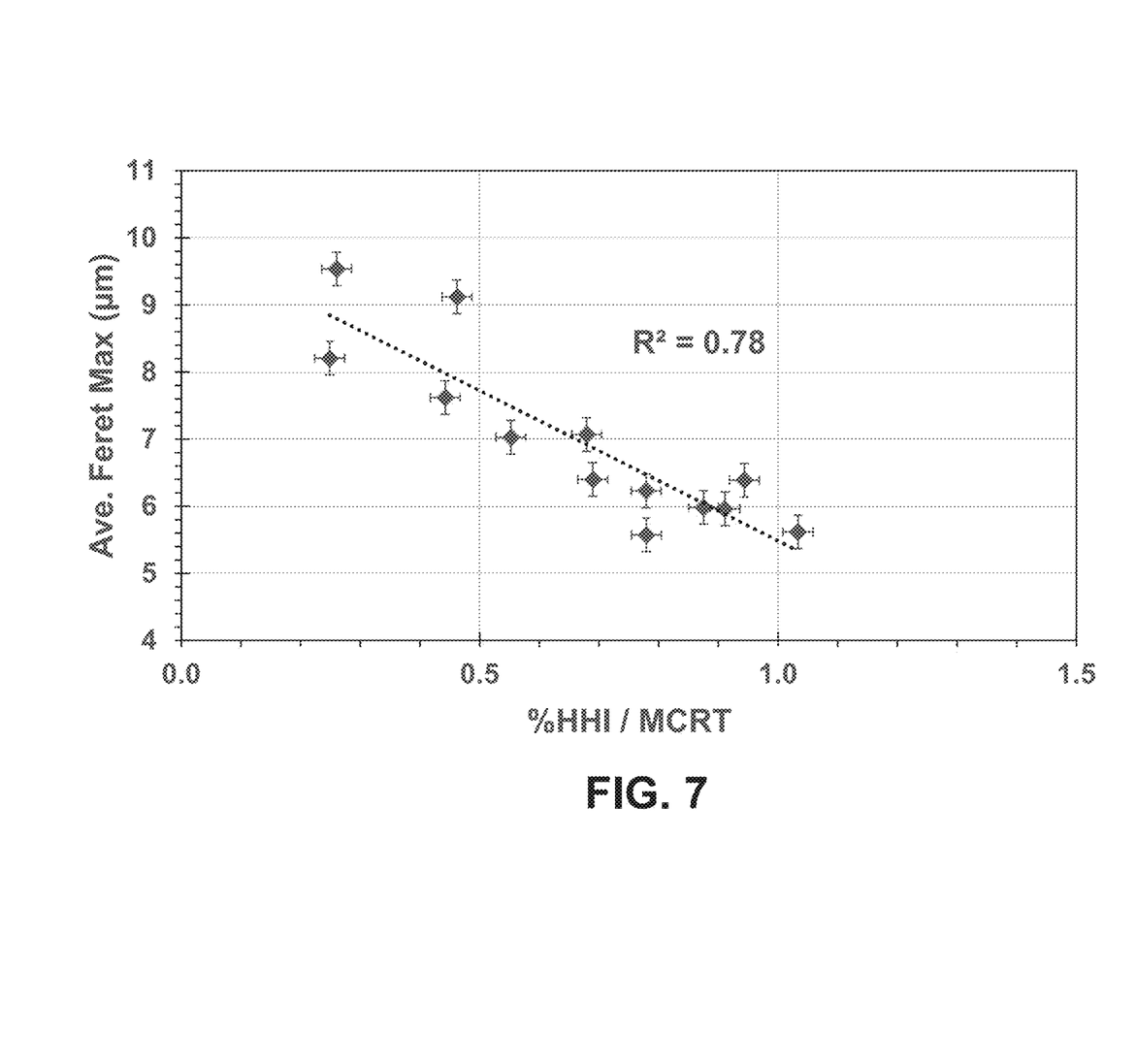
FIG. 7 is a plot of the average Feret maximum (µm) using the claimed methodology described in FIG. 5 vs. the % HHI/% MCRT ratio for a series of four-teen Delayed Coker feeds.

FIG. 6 shows a typically segmented micrograph obtained from processing the one depicted in FIG. 2. Significant features can be observed by segmentation that cannot be seen in a cross polarized light optical microscope.

An embodiment of the invention is the use of machine learning for image segmentation. The main advantages versus conventional methodologies (FIG. 1) are: a much larger set of particles are counted, equal to or greater than 1000 individual particles, so an improved repeatability is obtained throughout the whole range of particle sizes, less data dispersion and better correlations are obtained, and more structural parameters are correlated with feed characteristics. The use of a large data set yields meaningful, repeatable, and highly reliable statistics enabling one of skill in the art to more accurately correlate coke morphology to other feed properties. Furthermore, a single segmented model can be applied to different micrographs of coke from the same feed taken under the same conditions.

A further embodiment of the invention is utilizing any commercial software to perform image stitching. Image stitching is used to combine multiple photographic images with overlapping fields of view to generate a single, segmented high-resolution image. In this way, a much larger set of particles are counted. Image stitching is especially important when the individual grains of coke are greater than 20 µm like those found in sponge coke.

A further embodiment of the invention is the use of a high-resolution camera no less than 5 megapixels, preferably 12 megapixels, to capture the cross-polarized light optical microscopy images. In this way, higher resolution can be achieved especially for individual grains of coke that are smaller than 10 µm like those found in shot coke.

A further embodiment of the invention is predicting coke morphologies from blends of petroleum derived feedstocks, virgin and/or previously converted feeds, low percentage of distillable materials, high sulfur and nitrogen feeds, high metal containing feeds comprising of vanadium and nickel.

A further advantage to the method described herein is that the particles located on the edges of the segmented micrographs can be easily removed to improve repeatability. More than 2000 reflectors are analyzed from 2 representative images per feed. Following the image segmentation, the Zeiss Zen™ Intellesis™ software can perform a variety of image analysis techniques to yield statistics of more than 90 morphological parameters from each image. For this invention, the parameters selected were, but not limited to, the average Feret maximum, Feret minimum, particle's individual identification, region class color name, compactness, circularity, roundness, average area, percentage of particles with Feret lower than 10 µm, and elongation. It is important to mention that Feret is the distance of two tangent lines to a contour of the particle and is considered a measurement of the particle size.

Figure 8:
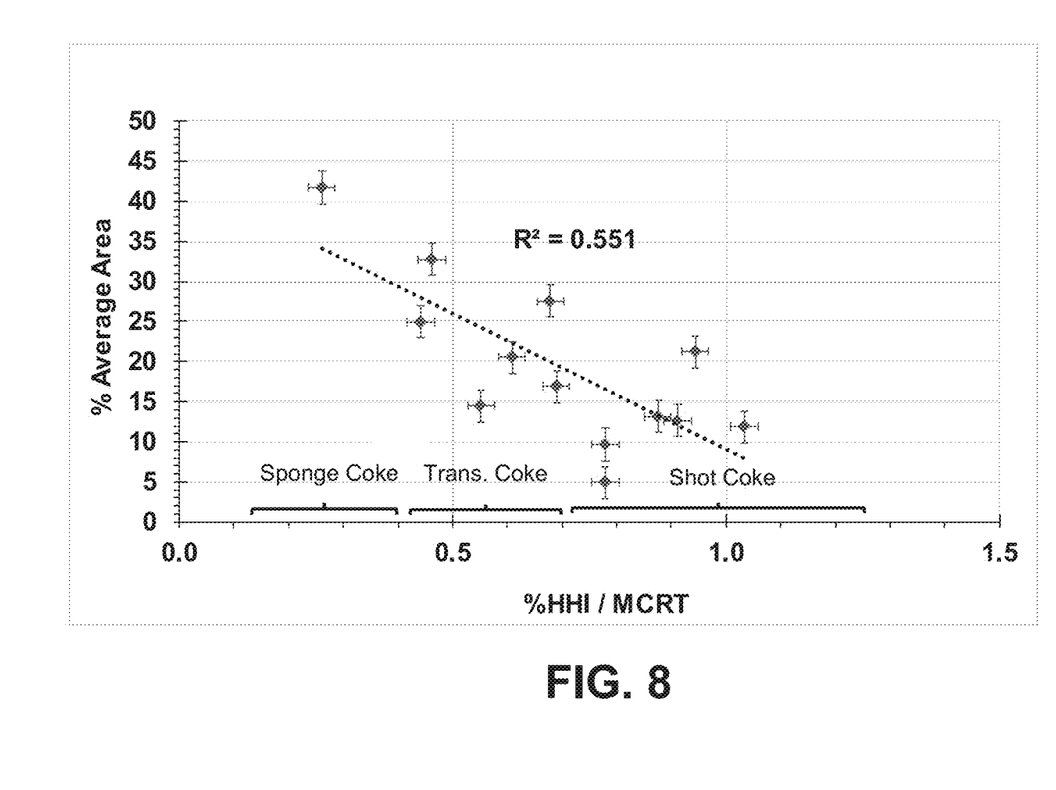
FIGS. 8 & 9 are plots of the average area and percentage of particles with Feret maximum lower than 10 µm vs. the % HHI/% MCRT ratio for a series of 14 Delayed Coking feeds. As seen, a smaller average area and a higher percentage of particles with Feret maximum lower than 10 µm can be found in shot cokes than the sponge coke counterparts. These correlations have relatively weak $R^2$ (0.45-0.55), but the tendency of the data is clear.
Figure 9:
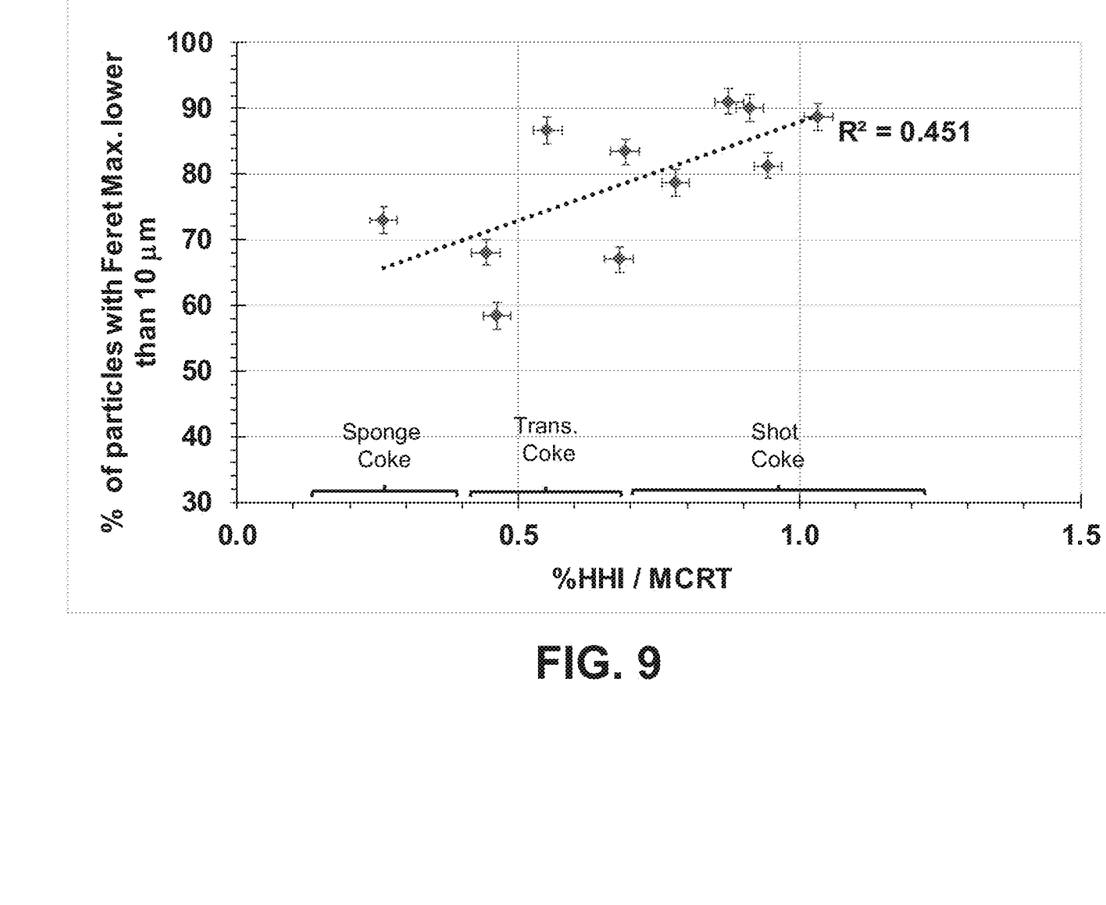

Other structural parameters obtained by the segmentation method (FIG. 5) could be used to predict the coke morphology. This data is not available using the conventional methodology (FIG. 1). For example, FIGS. 8 and 9 show the average area and percentage of particles with Feret maximum lower than 10 µm vs. the percentage of hot heptane insolubles (% HHI)/% MCRT ratio for a series of 14 Delayed Coking feeds. As seen, smaller average area and a higher percentage of particles with Feret maximum lower than 10 µm can be found in shot cokes than the sponge coke counterparts. These correlations have relatively weak $R^2$ (0.45-0.55), but the tendency of the data is clear.

Figure 10:
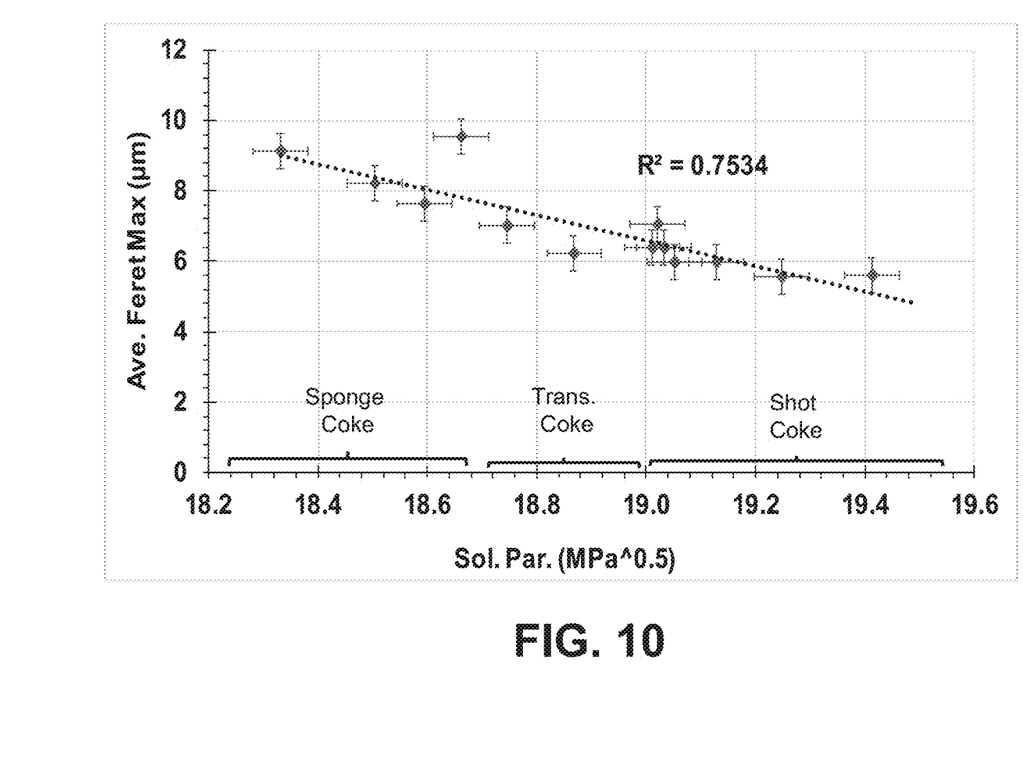
FIGS. 10 and 11 are plots of the average Feret maximum and average area of particles determined using the segmentation method vs. the solubility parameter for a series Delayed Coking feeds. As seen, correlation factors in the 0.67-0.75 were found. Thus, feeds with low average Feret maximum and average areas have a higher tendency to form shot coke.
Figure 11:
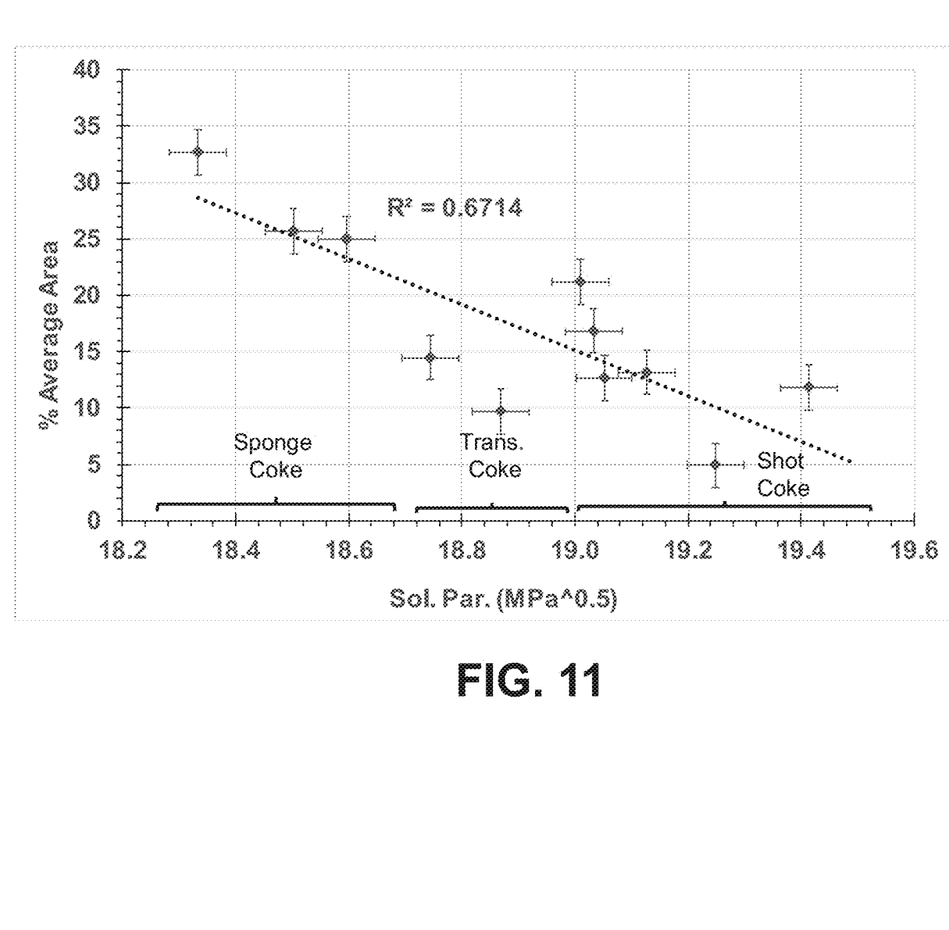

Similarly, other feed characteristics can be correlated to the structural parameters determined by the method described in this invention (FIG. 5) and used to predict coke morphology for Delayed Coking. Siskin et al. reported that asphaltenes with higher solubility parameters favor phase separation from the hydrocarbon matrix and lead to shot coke formation. FIGS. 10 and 11 show the average Feret maximum and average area of particles determined using the segmentation method vs. the solubility parameter for a series Delayed Coking feeds. As seen, correlation factors in the 0.67-0.75 were found. Thus, feeds with low average Feret maximum and average areas have a higher tendency to form shot coke.

Figure 12:
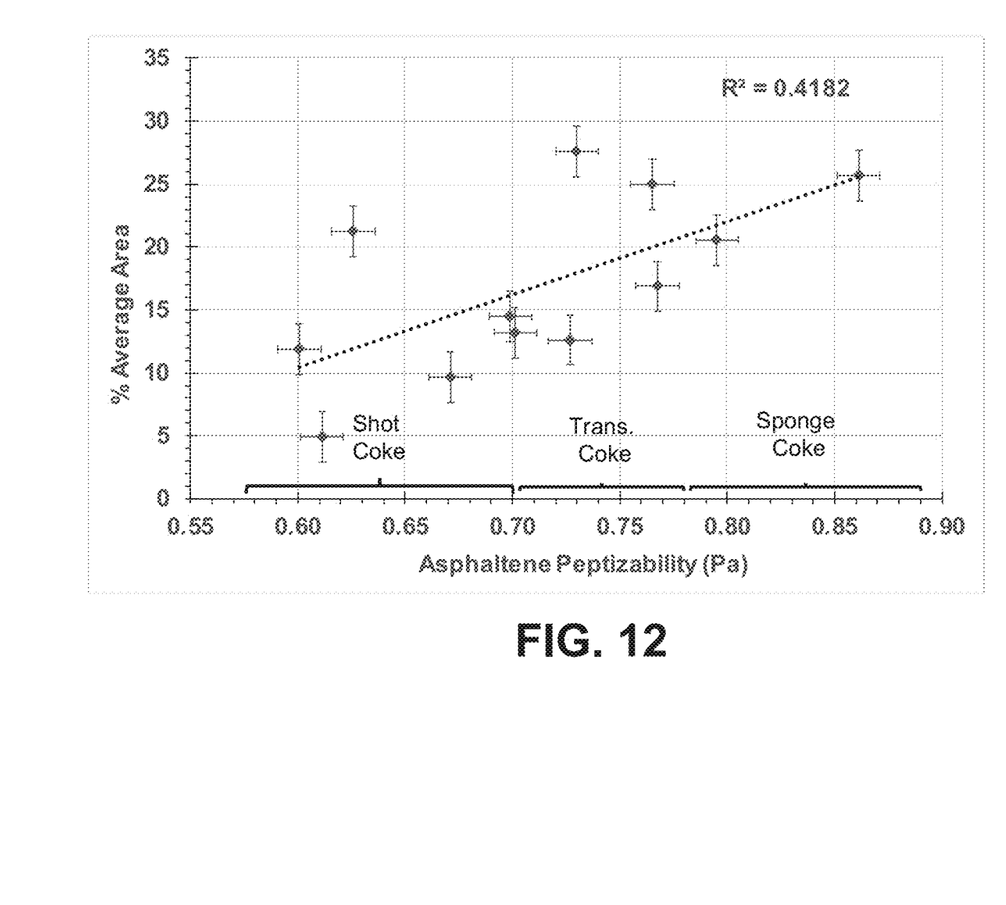
FIG. 12 is a plot of the average area of particles determined using the method of the invention described herein (FIG. 5) vs. asphaltene peptizability (Pa) for a series of 12 Delayed Coking feeds.

It is known in the state of the art that unstable feeds favor the formation of shot cokes, U.S. Pat. No. 7,803,627, US 2012/0298553. These reports give support to the hypothesis that asphaltene stability and coke morphology are linked. By stability measurements using transmittance to detect the flocculation onset, the peptizability (Pa) can be determined. As seen in FIG. 12, the average area of particles determined using this invention (FIG. 5) is directly proportional to Pa for a series of twelve Delayed Coking feeds. Thus, lower peptizability, more unstable the feed becomes and therefore, a higher tendency to form shot coke. This correlation has a relatively small $R^2$ (0.42), but the trend of the data is clear.

What is claimed is:

1. A method for the prediction of detecting coke morphology from feed characteristics comprising
   a) Performing a microcarbon test (MCRT) on a coker feed, ASTM D 4530 to produce a MCRT coke sample,
   b) Using cross-polarized light optical microscopy at 500× to produce a photo of the MCRT coke sample,
   c) Determining morphological patterns of image segments from step b, for detection of shot, sponge and transitional coke, using machine learning segmentation software to produce a segmented output file that comprises a partitioned image with multiple segments containing particles numbering 1000 or more,
d) Determining structural parameters of output file by applying statistical analysis weighted by area,
e) Correlating the resulting statistical analysis to a coke morphology.

2. The method of claim 1 wherein the structural parameter is Feret maximum calculated by statistical analysis.

3. The method of claim 1 wherein the structural parameter is number of particles less than or equal to 10 μm calculated by statistical analysis.

4. The method of claim 3, wherein there is a correlation of area, ferret max and particles less than or equal to 10 μm to % HHI/MCRT ratio, Asphaltene solubility parameter, Asphaltene peptizability.

5. The method of claim 1 wherein the structural parameter is area calculated by statistical analysis.

6. The method of claim 1 wherein the feed is selected from the group consisting of blends of petroleum derived feedstocks, virgin and/or previously converted feeds, low percentage of distillable materials, high sulfur and nitrogen feeds, high metal containing feeds.

7. The method of claim 6 wherein the metal in the high metal feed is selected from the group consisting of vanadium and nickel.

* * * * *